A. ANDERSON.
SPRING FORK FOR MOTOR CYCLES.
APPLICATION FILED MAR. 29, 1916.
1,213,995.
Patented Jan. 30, 1917.
2 SHEETS—SHEET 1.
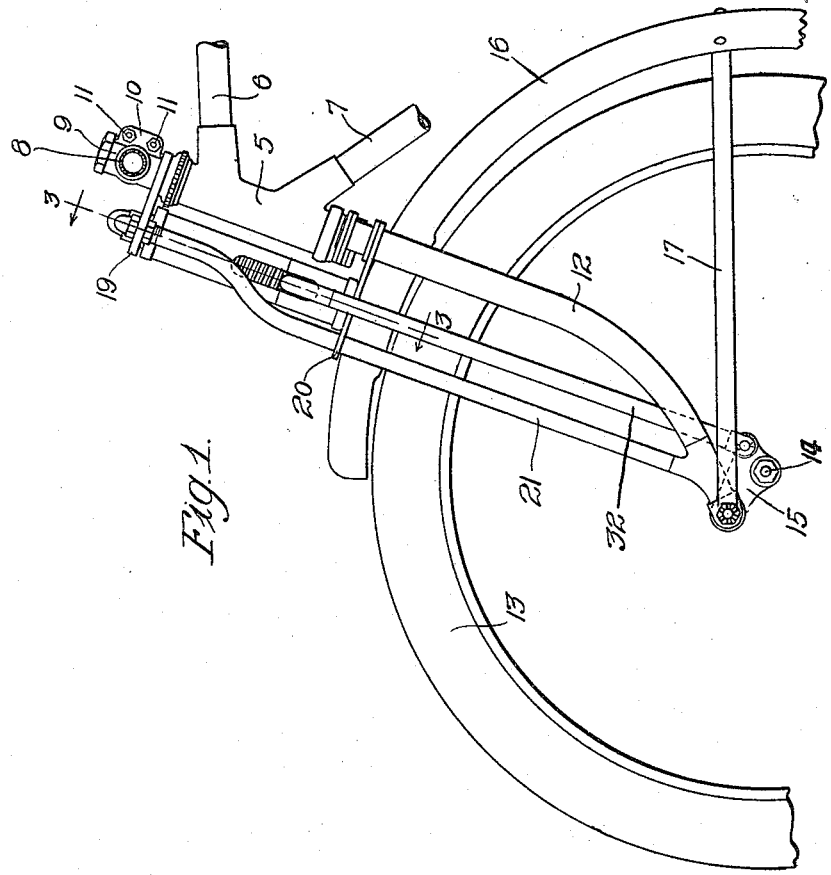
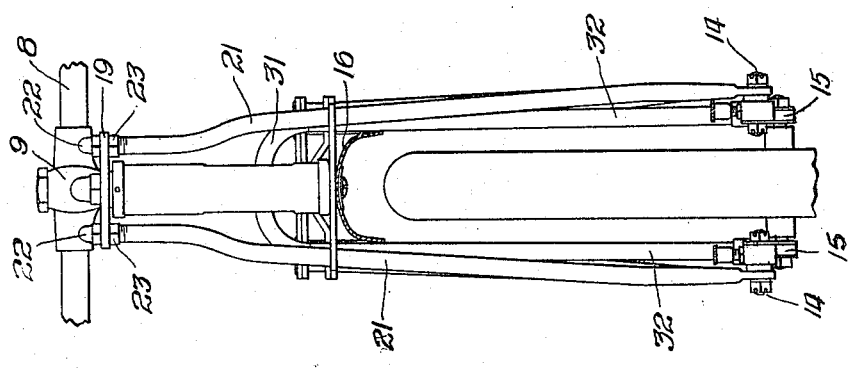
Witness:
Harry S. Gaither
Inventor
Adolph Anderson
by
Poole & Wann
Attys.

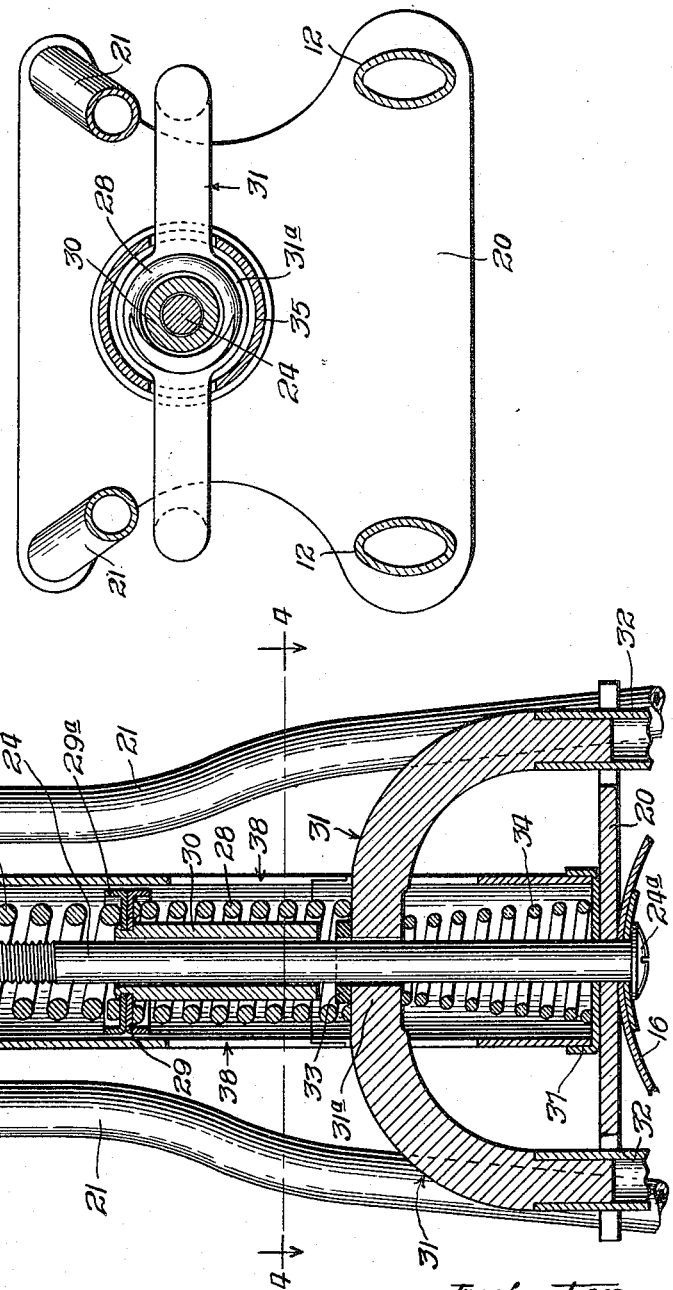

UNITED STATES PATENT OFFICE.

ADOLPH ANDERSON, OF CHICAGO, ILLINOIS, ASSIGNOR TO AURORA AUTOMATIC MACHINERY COMPANY, OF CHICAGO, ILLINOIS, A CORPORATION OF DELAWARE.

SPRING-FORK FOR MOTOR-CYCLES.

1,213,995.        Specification of Letters Patent.        Patented Jan. 30, 1917.

Application filed March 29, 1916. Serial No. 87,384.

*To all whom it may concern:*

Be it known that I, ADOLPH ANDERSON, a citizen of the United States, and a resident of Chicago, county of Cook, State of Illinois, have invented certain new and useful Improvements in Spring-Forks for Motor-Cycles; and I do hereby declare that the following is a full, clear, and exact description thereof, reference being had to the accompanying drawings, and to the reference characters marked thereon, which form a part of this specification.

This invention relates to improvements in the frame construction for motorcycles and other two-wheeled vehicles, and more particularly to an improved spring construction coöperating with the front fork of the vehicle, such construction being ordinarily known as a spring fork, and provided for the purpose of absorbing the shocks to which the vehicle is subjected in passing over obstructions or rough places in the roadway.

The object of the present invention is to provide a spring fork construction which embodies, in general, relatively light and heavy springs, so arranged that the lighter of the springs will act to absorb the lighter or ordinary shocks transmitted to the front wheel of the vehicle, and the heavier spring to absorb the heavy or severe shocks, such as would be beyond the range or exceed the capacity of the lighter spring.

A further object of the invention is to provide means whereby the rebound action of the shock absorbing springs will be compensated or otherwise opposed so that the so-called rebound action will be eliminated and, likewise, the resulting jar or vibration, which otherwise would be transmitted to the frame.

The features of construction embodying the device calculated to secure the objects hereinbefore recited will be clearly understood from the following description and in connection with the accompanying drawings, in which—

Figure 1 is a view in side elevation of the front portion of a motorcycle and the spring fork construction; Fig. 2 is a view in elevation, looking in a direction toward the front of the vehicle; Fig. 3 is an enlarged cross-sectional view, taken on line 3—3 of Fig. 1 and showing the details of construction of the shock absorbing members; and Fig. 4 is an enlarged, transverse, sectional view taken on line 4—4 of Fig. 3.

Referring now to the drawings, Fig. 1 shows the forward portion of the frame of a motorcycle or other two-wheeled vehicle, which consists of the steering or front head 5 and frame members 6, 7, which extend rearward and join the head with the remaining portion of the frame (not shown). The head is of the usual construction, embracing a tubular member, which surrounds and serves as a bearing for the fork stem (not shown), the latter being journaled in suitable antifriction bearings provided at the upper and lower extremities of the head. The fork stem extends from the upper end of the head and beyond the same, and is rigidly connected to the handle bar 8, the latter being provided with a split cylindric portion 9 fitting over the end of the fork stem and secured thereto by means of lugs 10, which are tightened, by means of suitable bolts 11, 11, to secure the cylindric member of the handle bar to said fork stem. The lower end of the fork stem is rigidly connected to the fork members 12, 12, which are spaced apart in the usual manner and extend downwardly with a slight forward curvature on either side of the front wheel 13 of the vehicle. The lower extremities of the fork members are connected to the axle 14 of the front wheel through the medium of rocker plates or links 15, 15, which will be hereinafter more fully described. A mud guard 16 extending between the front fork and surrounding a portion of the wheel 13 is supported by radial braces 17 fixed to the lower ends of the fork members 12, 12.

Referring now to the parts of the device embodying the features of my invention, there is provided at the upper end of the head 5, and immediately below the handle bar 8, a supporting and adjustment plate 19, which is rigidly fixed to the fork stem and projects forwardly therefrom at right angles to said head 5 of the vehicle frame. Located immediately below said head is another and similar supporting plate 20, rigidly secured to the fork members 12, 12 adjacent their upper extremities, the same extending forwardly from said fork members and in parallel relation to the upper plate 19. Extending from the lower extremities of the fork members 12, 12 and upwardly in a direction generally parallel to said fork and head 5 are two fork stays 21, 21, which are spaced forwardly from the fork members and extend on either side of the front wheel. As a preferable construction, the fork stays 21 are tubular in form and join the lower ends of the fork members in the form of an integral joint, as shown in Fig. 1. The fork stays extend through apertures formed in the lower plate 20, said plate acting to brace said stays at a point substantially midway of their length and to space the same laterally apart and forwardly from the fork members 12, 12. The upper extremities of the fork stays extend through the upper plate 19, the portions of the stays intermediate the plates 19 and 20 being preferably tapered or bowed inwardly toward each other, as well as rearwardly in the direction of the head 5. The upper ends of the fork stays are offset laterally on either side of the head, and are held from endwise movement by means of cap nuts 22, mounted on the extremities of the fork stays above said plate 19, and, further, by means of lock nuts 23 immediately below said plate, said lock nuts having screw-threaded engagement with said fork stays, thereby permitting the same to be loosened for the purpose of making adjustments in the fork stays by the rotation of the cap nuts 22 in contact with the plate 19, which acts as a base for such adjustments.

Extending between the plates 19 and 20 is a comparatively long bolt 24, provided at its lower end with a head 24ª below the lower plate 20, said bolt extending upwardly through the mud guard 16 and the lower plate 20, and at its upper end is provided with a screw-threaded portion, which extends through and beyond the upper plate 19 and at a point midway between the extremities of the fork stays 21, 21, said threaded extremity of the bolt being preferably mounted in and having screw-threaded engagement with a bushing 26, the latter being provided with external screw threads, which engage a threaded aperture in said plate 19. The projecting end of the bolt 24 is surmounted by a cap nut 25, having screw-threaded engagement with the end of said bolt and a threaded extremity of said bushing, and bearing against the surface of the plate 19, thereby providing for adjustments in the bolt by the tightening or loosening of said cap nut.

Surrounding the bolt 24 are the several springs which constitute the shock absorbing elements of the device. These springs occupy substantially the entire space between the plates 19 and 20, and the same, together with the parts of the device coöperating with them, may be described as follows: Surrounding the upper portion of the bolt is the heavy spring 27, hereinbefore referred to, the same being of the coil or spiral form and consisting of a plurality of convolutions of comparatively heavy material, thereby providing a spring capable of withstanding the heavier and more severe shocks without being compressed to its fullest extent. Immediately below and in axial alinement with the heavy spring 27 is a lighter coil spring 28 (which may be termed the light spring of the device), consisting of substantially the same number of convolutions as the heavy spring 27 but of relatively lighter material and designed to oppose only the lighter or ordinary shocks transmitted thereto. The heavy spring 27 and the light spring 28 are separated by a collar 29, the same surrounding the center bolt 24 and provided with peripheral flanges 29ª, which form oppositely opening recesses in which the adjacent ends of the springs 27 and 28 are retained. Surrounding the bolt 24, and extending axially thereof throughout the portion of the bolt surrounded by the spring 28, is a sleeve 30, the same being located between said spring and the surface of the bolt. The upper end of the sleeve 30 is rigidly connected to the collar 29, said sleeve being preferably porvided with a circumferential groove at its upper end, within which is retained the internal margin of said collar 29. Said sleeve 30 extends from the collar 29 downwardly to a point spaced a short distance from the lower extremity of the light spring 28. The lower end of the light spring engages or bears upon an inverted U-shaped member or yoke 31 having an enlarged circular portion 31ª surrounding the bolt 24 and provided with a central aperture, through which said bolt extends. The ends of the U-shaped yoke extend laterally from the central portion 31ª thereof, and are curved downwardly at an angle of substantially 90°, their ends being rigidly connected to a pair of tubular compression rods 32, 32, which extend downwardly on either side of the wheel 13, substantially parallel with the fork stays 21, and have pivotal connection with the rocker plates or links 15, 15 at points offset horizontally and rearwardly from the points at which the front fork members are connected with said plates and adjacent to the axle 14 of the front wheel. The compression rods 32, together with the U-shaped yoke 31, constitute the endwise movable member which transmits the shocks and vibrations received by the front wheel to the springs 27 and 28, the upward movement of said member being opposed successively by said springs in a manner hereinafter to be described, and bears upwardly against the light spring 28. Intermediate the upper surface of the yoke 31 and the lower extremity of the sleeve 30 is a washer 33, which surrounds the rod 24 and is normally spaced a short distance from the lower end of the sleeve 30 and interposed between said sleeve and the adjacent surface of the yoke member. This washer is preferably constructed of fiber or like material, and is adapted to deaden the sound when the same comes in contact with the metal sleeve 30 in the upward movement of said yoke member. Immediately below the central portion 31ª of the U-shaped yoke 31 is another coil spring 34, surrounding said bolt and arranged in axial alinement with the springs 27 and 28. The spring 34 bears upwardly against the under surface of said yoke and rests at its opposite end adjacent to the lower plate 20. The spring 34 is the rebound spring of the device, and is preferably of the tapered coil form in order that it may respond and compensate the action of the heavy spring 27 and the light spring 28 irrespective of the severity of the shock to which said springs are subjected.

The springs and adjacent parts are surrounded by and inclosed within a cylindric housing or casing 35, the same extending from the lower to the upper plate and forming a complete closure for the device, thereby protecting the same from dust and grit. The upper and lower ends of the housing are covered by flanged cap members 36 and 37. The upper cap member is interposed between the heavy spring 27 and the bushing 26, and the lower cap member between the lower end of the rebound spring 34 and the lower plate 20. The housing 35 is provided with longitudinally extending and diametrically opposed slots 38 extending through the portion thereof adjacent to the light spring 28 and the upper portion of the recoil spring, said slots being provided for the purpose of permitting the free vertical movement of the arms of the U-shaped yoke member.

Referring more in detail to the rocker plates or links 15, 15, the fork members 12, 12 are pivotally connected at the forward ends thereof (Fig. 1), and forwardly of and a short distance above the bearing of the axle 14 of the wheel. The compression rods are also pivotally connected to said plates 15, 15 and at a point adjacent to said axle and rearwardly of the points of pivotal connection of said front fork members 12, 12 with said plates. By this arrangement, therefore, the wheel is connected to the frame through the medium of the links, and is capable of being rotated bodily about the ends of the forks and through an arc whose radius is the distance between the axes of the axle and the fork journals.

Referring now to the manner in which the spring construction operates to absorb any shocks that may be received by the striking of the front wheel against any obstruction or rough places in the roadway, it is first to be noted that the effect of the contact between the front wheel and any obstruction is to revolve the wheel and its axle 14, together with the rocker plates 15, 15, in a counter-clockwise direction about the pivotal point of the fork with said rocker plates, this movement being due to the fact that the vehicle frame tends to remain stationary and the wheel to be moved vertically upward in passing over the obstruction. By reason of the fact that the axle is offset rearwardly from the point at which the lower ends of the fork members 12, 12 are attached to the rocker plates, it is evident that the shock received by the wheel is not transmitted directly to the vehicle frame through the fork members 12, 12, but is resolved into a rotative movement of the rocker plates, said movement being directly opposed by the compression rods 32, 32, which receive a compressive strain. The compression rods, however, being capable of endwise movement, transmit the compressive strain to which they are subjected, directly to the springs of the shock absorbing device. Thus when a shock is transmitted to the compression rods, as stated, the result is an upward movement of the yoke 31 and a corresponding compression of the light spring 28, the heavy spring 27 being unaffected by the shock, it being assumed for the present that the shock is of the ordinary character. As shown in Fig. 3, the movement of the yoke relative to the sleeve 30 is limited by the space which separates the fiber washer 33 and the lower extremity of said sleeve. Thus when a shock is transmitted through the compression rod of such a severity as to effect the movement of the upper end of the yoke member into contact with the sleeve, the same is moved endwise and in an upward direction carrying with it the collar 29.

Inasmuch as the heavy spring 27 bears downwardly upon the collar and opposes any upward movement thereof, it is clear that the heavy spring comes into action and directly opposes the movement of the yoke, the light spring 28 being simultaneously replaced by a non-yielding member in the form of the sleeve 30 to the extent that upward movement of the yoke is opposed by the heavy spring only so long as the sleeve 30 and collar 33 are in contact, although the light spring remains effective to a certain degree, inasmuch as it is under compression, hence it acts to move the yoke member downwardly.

From this description of the operation it is now clear that the range or extent of action of the light spring is limited, and therefore capable of absorbing the ordinary or lighter shocks that are encountered by the vehicle in passing over a roadway, and that, in the event a severe or extraordinary shock is received by the vehicle, it is transmitted "around," so to speak, said light spring and is opposed by the heavy spring. It is to be noted, however, that the springs are arranged so that the heavy spring is subjected to all shocks transmitted thereto through the light spring, but the former is of such strength as not to be compressed any substantial amount, under the ordinary shocks or vibrations encountered by the vehicle. In this manner the shocks are transferred from one spring to the other, depending on the degree of severity thereof, gradually and without interrupting the smoothness of their action.

The rebound spring is constantly in action, inasmuch as it opposes the expansion of both the light spring 28 and the heavy spring 27, the nature of its function being to compensate or oppose the sudden downward movement of the yoke member after the shock has been absorbed by the springs and the compression rods seek their normal position after the obstruction has been passed.

The advantage of the device embodying the features of construction herein described resides to a large degree in the presence of a light and a heavy spring, one of which is light enough to respond to every jar or shock no matter how slight, and another which is heavy enough to withstand the heaviest and most severe shocks that may be encountered. This advantage is appreciated when it is noted that it is practically impossible to provide a single spring which would be of sufficient flexibility to respond to the lightest shocks and at the same time have sufficient strength to resist the heaviest shocks without transmitting at least a part thereof directly to the frame. The presence of the rebound spring is obviously an added advantage inasmuch as it is a well recognized fact that the rebound in shock absorbing springs produces vibrations and jars in the vehicle frame which are equally as undesirable as the shocks received and absorbed directly by the shock absorbing springs.

The various features of construction of the device embodying the invention may be variously modified without departing from the spirit of the invention, therefore I do not wish to be limited to the disclosure herein made, except in so far as specifically set forth in the appended claims.

I claim as my invention:

1. In a vehicle frame, the combination of a fork member, a wheel connected to the lower end of said fork member, shock absorbing means operatively connected to said wheel and embracing a plurality of springs varying in tension and arranged to absorb the shocks delivered in one direction, and means for limiting the action of one of said springs.

2. In a vehicle frame, the combination of a fork member, a wheel movably connected to said fork member, yieldable shock absorbing means connected to the axle of said wheel and embracing a plurality of springs arranged to oppose the bodily movement of said wheel in one direction, said springs varying in tension, and means for limiting the action of the lighter of said springs.

3. In a vehicle frame, the combination of a fork member, a wheel rockingly connected to said fork member, a plurality of springs mounted on said frame and acting to oppose the bodily movement of said wheel in one direction, one of said springs being relatively light and acting to absorb the correspondingly light shocks delivered to said wheel, and means acting to limit the action of said lighter spring and to transfer to said heavier spring the shocks exceeding the capacity of said lighter spring.

4. In a vehicle frame, the combination of a fork member, a wheel rockingly connected to said fork member, relatively light and heavy springs mounted on said frame and coöperating to oppose the bodily movement of said wheel in one direction, means connecting the lighter spring to the axle of said wheel, and non-yieldable means connected with said heavier spring and acting to replace said lighter spring and to transfer the movements of said wheel exceeding the capacity of said lighter spring, to said heavier spring.

5. In a vehicle frame, the combination of a fork member, a wheel connected to said fork member and movable bodily with respect thereto, relatively light and heavy springs mounted on said frame and acting to oppose the bodily movement of said wheel in one direction, a compression member connecting said wheel and the lighter spring, and means connected with said heavier spring and adapted to engage said compression member, to permit the said heavier spring to oppose the movements of said wheel exceeding the capacity of said lighter spring.

6. In a vehicle frame, the combination of a fork member, a wheel rockingly connected to said fork member, relatively light and heavy springs adapted to oppose the bodily movement of said wheel in one direction, a compression member positively connecting said light spring and wheel, and a non-yieldable member connected with said heavier spring and adapted to engage said compression member to transmit the bodily movement of said wheel directly to said heavier spring under correspondingly heavy shocks received by said wheel.

7. In a vehicle frame, the combination of a fork member, a wheel rockingly connected to said fork member, relatively light and heavy springs mounted on said frame and acting to oppose the bodily movement of said wheel in one direction, under the shocks received by said wheel, means for limiting the action of the lighter spring, and a spring acting to oppose the bodily movement of said wheel in the opposite direction.

8. In a vehicle frame, the combination of a frame head, a front fork rotatively mounted in said head and rockingly connected with the axle of a front wheel, a compression member connected with said axle, relatively light and heavy springs arranged in axial alinement and mounted on said fork, said light spring having bearing engagement with said compression member, and means operatively connected with said heavy spring and adapted to engage said compression member to transmit the movement thereof directly to said heavy spring.

9. In a vehicle frame, the combination of a fork member, a wheel rockingly mounted on said fork member, relatively light and heavy springs acting to oppose the bodily movement of said wheel in one direction and arranged in axial alinement and in bearing engagement at their adjacent ends, a compression member operatively connected with said wheel and in bearing engagement with the free end of said lighter spring, and a non-yieldable member connected with said heavier spring and arranged to engage said compression member and to replace said lighter spring, thereby effecting the direct transmission of the correspondingly heavier shocks to said heavier spring.

10. In a vehicle frame, the combination of a frame head, a front fork rotatively mounted in said head and rockingly connected with the axle of a front wheel, a compression member connected with said axle, relatively light and heavy springs mounted on said fork and arranged end to end, the opposite end of said light spring having bearing engagement with said compression member, and means for limiting the action of said light spring and for transmitting the movement of said compression member directly to said heavy spring.

11. In a vehicle frame, the combination of a fork member, a wheel rockingly connected with the ends of said fork member, a plurality of springs varying in tension and acting to oppose the correspondingly varying bodily movement of said wheel in one direction, a non-yieldable member operatively connected with said springs and acting to limit the action of said lighter spring, and a spring acting on said wheel to oppose its movement in the opposite direction under the action of said first mentioned springs.

12. In a vehicle frame, the combination of a frame head, a front fork rotatively mounted in said head and rockingly connected with the axle of a front wheel, a compression member connected with said axle, relatively light and heavy springs arranged end to end, said light spring bearing on said compression member and located intermediate the same and said heavy spring, and a non-yielding member connected to said heavy spring and adapted to engage said compression member to limit the action of said light spring and acting to transmit the movement of said compression member directly to said heavy spring.

13. In a vehicle frame, the combination of a frame head, a front fork rotatively mounted in said head and rockingly connected with the axle of a front wheel, a compression member connected with said axle, relatively light and heavy springs arranged end to end with said light spring intermediate said compression member and said heavy spring, means for limiting the action of said light spring and connecting said compression member directly to said heavy spring, and a rebound spring acting on said compression member to oppose the movement of the same under the action of said first mentioned springs.

14. In a vehicle frame, the combination of a frame head, a front fork rotatively mounted in said head and rockingly connected with the axle of a front wheel, a compression member connected with said axle, parallel plates carried by said fork, relatively light and heavy springs mounted end to end between said plates, said light spring bearing on said compression member, and a non-yielding member connected with said heavy spring and adapted to engage said compression member to limit the action of said light spring and to connect said compression member directly with said heavy spring.

15. In a vehicle frame, the combination of a frame head, a front fork rotatively mounted in said head, transversely disposed links connecting the ends of said fork with the axle of a front wheel, an endwise movable compression member pivotally connected with said links adjacent said axle, relatively light and heavy springs mounted on said forks and alternately acting to oppose the movement of said compression member, said light spring being adapted to oppose the movement of said compression member throughout a predetermined range, and means, including a non-yielding member acting to replace said lighter spring to permit said heavier spring to oppose the movement of said compression member exceeding the range of said light spring.

16. In a vehicle frame, the combination of a frame head, a front fork rotatively mounted in said head and rockingly connected with the axle of a front wheel, a compression member connected with said axle, parallel plates mounted on said fork adjacent said head, a bolt connecting said plates, a relatively light spring and a heavy spring surrounding said bolt between said plates, said springs being arranged end to end with said light spring in bearing engagement with said compression member, and a sleeve surrounding said bolt adjacent said light spring and connected with the lower end of said heavy spring, said sleeve being adapted to engage said compression member to limit the action of said light spring and to connect said compression member directly to the heavy spring.

In testimony that I claim the foregoing as my invention, I affix my signature in the presence of two witnesses, this 8th day of March, A. D. 1916.

ADOLPH ANDERSON.

Witnesses:
 EDW. GUSTAFSON,
 WM. H. COVENTRY.